United States Patent [19]
Lorenzi et al.

[11] Patent Number: 4,630,199
[45] Date of Patent: Dec. 16, 1986

[54] MESSAGE TRANSMISSION, RECEPTION AND PROCESSING APPARATUS FOR A TELEPRINTING STATION

[75] Inventors: Mario Lorenzi, Ivrea; Umberto Ratti, Turin; Arturo Severini, Ivrea, all of Italy

[73] Assignee: Ing. C. Olivetti & C., S.p.A., Ivrea, Italy

[21] Appl. No.: 591,246

[22] Filed: Mar. 20, 1984

Related U.S. Application Data

[63] Continuation of Ser. No. 273,615, Jun. 15, 1981, abandoned.

[30] Foreign Application Priority Data

Jun. 16, 1980 [IT] Italy ............... 67933 A/80

[51] Int. Cl.$^4$ ............................................. G06F 15/16
[52] U.S. Cl. ................................................. 364/200
[58] Field of Search ............... 364/200, 900; 370/16, 370/24

[56] References Cited

U.S. PATENT DOCUMENTS

| | | | |
|---|---|---|---|
| 3,710,324 | 1/1973 | Cohen et al. | 364/200 |
| 3,940,743 | 2/1976 | Fitzgerald | 364/200 |
| 4,057,849 | 11/1977 | Ying et al. | 364/200 |
| 4,117,469 | 9/1978 | Levine | 364/200 |
| 4,144,407 | 3/1979 | Zaffignani et al. | 370/16 |
| 4,145,739 | 3/1979 | Dunning et al. | 364/200 |
| 4,218,738 | 8/1980 | Matyas et al. | 364/200 |
| 4,232,188 | 11/1980 | Giersberg | 370/24 |

*Primary Examiner*—Gareth D. Shaw
*Assistant Examiner*—Daniel K. Dorsey
*Attorney, Agent, or Firm*—Banner, Birch, McKie & Beckett

[57] ABSTRACT

The apparatus comprises an electronic teleprinter constituted by a first set of basic peripheral units such as the printer, keyboard etc. as well as a punch/reader, arranged to converse directly with the line and controlled by a first central unit, and a second set of peripheral units such as a disc unit, one line display and VDU controlled by a second CPU and able to execute more sophisticated operations such as the automatic filing of messages, their display etc. The two CPUs each autonomously control their own peripheral units with simultaneous processing, and periodically communicate with each other for the exchange of data and commands by way of an interface in an auxiliary unit. The CPU of the basic machine is thus free to handle the basic input/output procedures without having to service the auxiliary peripherals.

12 Claims, 14 Drawing Figures

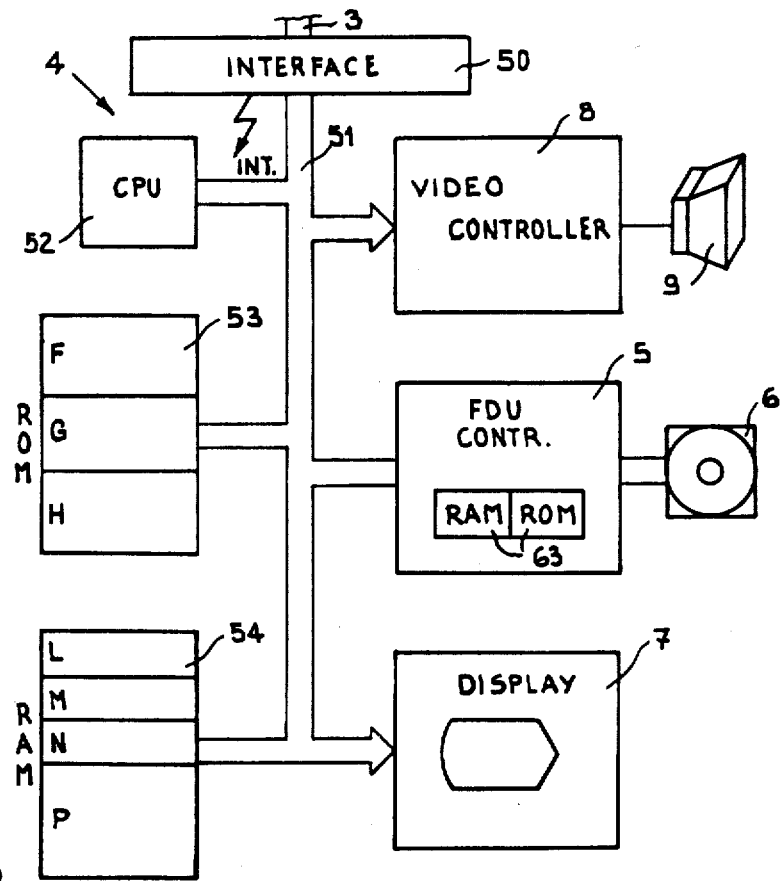
FIG.3
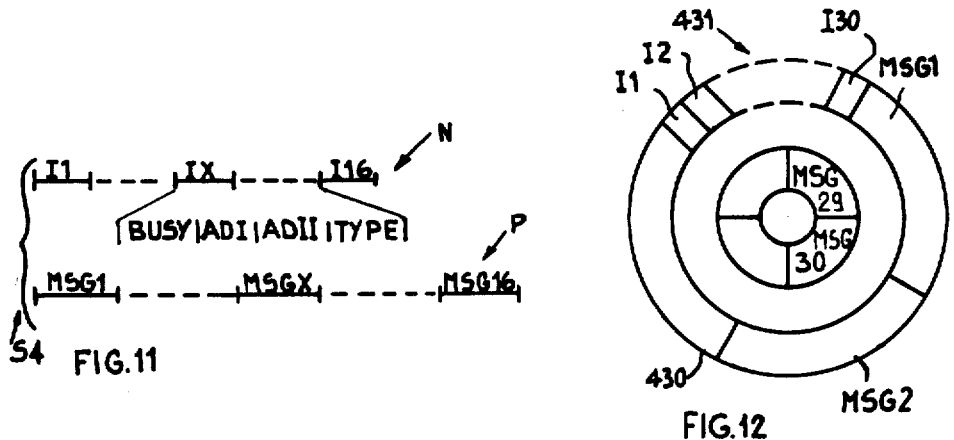
FIG.11
FIG.12

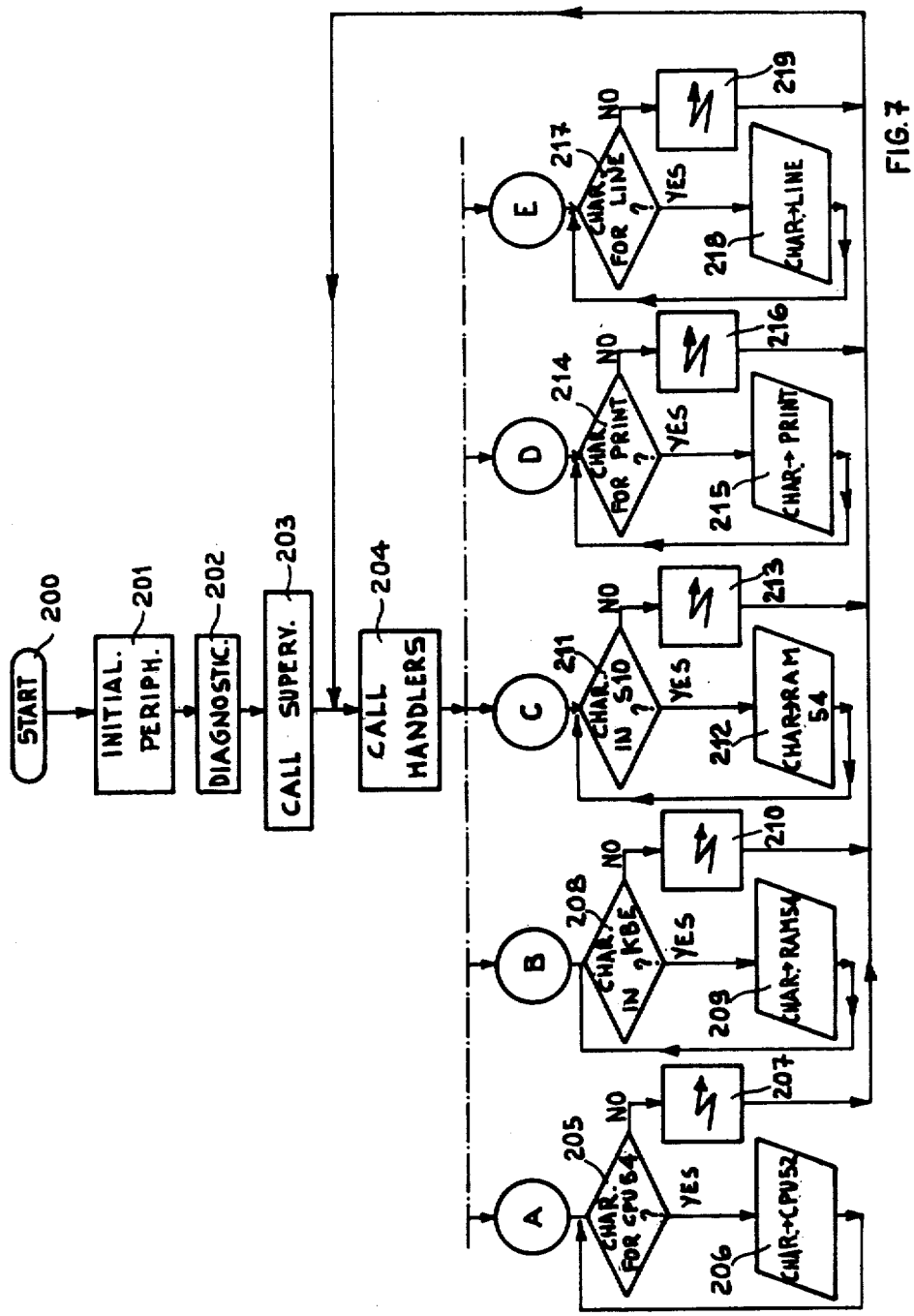

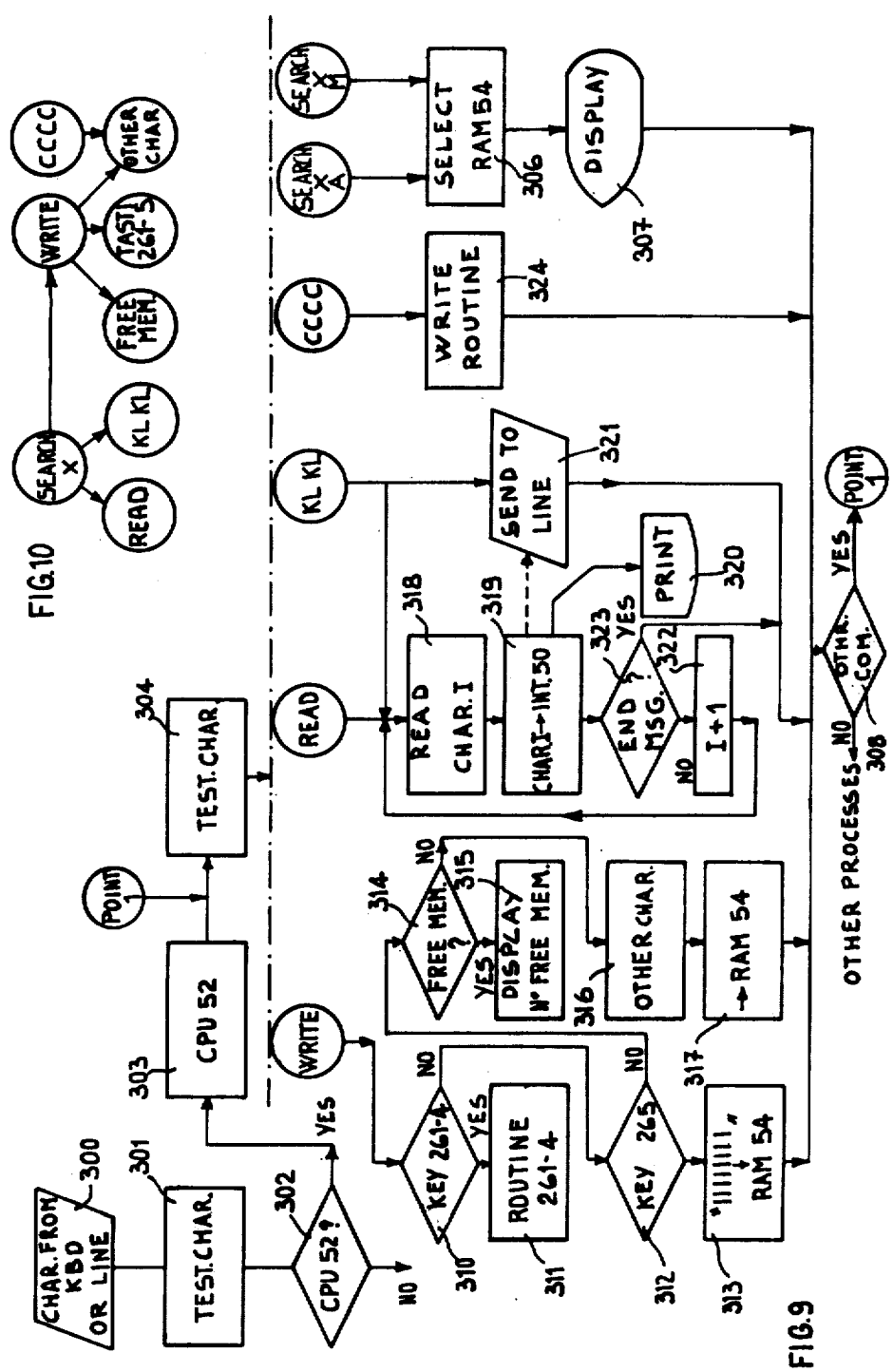

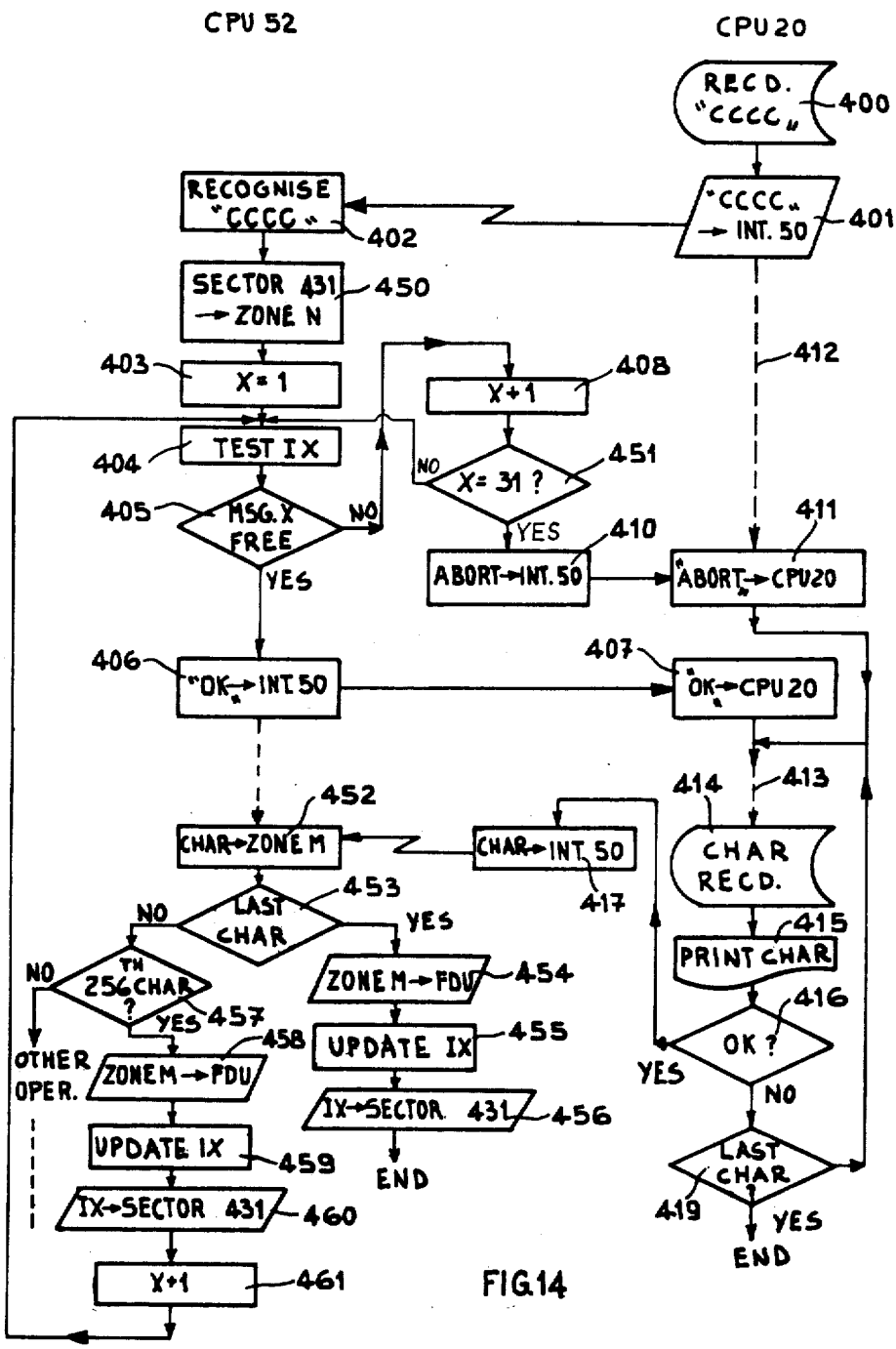

MESSAGE TRANSMISSION, RECEPTION AND PROCESSING APPARATUS FOR A TELEPRINTING STATION

This application is a continuation of Ser. No. 273,615, filed June 15, 1981, now abandoned.

BACKGROUND OF THE INVENTION

This invention relates to a message transmission, reception and processing apparatus comprising a set of peripheral units such as a tape reader, tape punch, printer, magnetic storage VDU etc., to facilitate operator-machine conversation and to increase the performance of the apparatus itself, for example by processing messages, completing texts, automatically filing texts, transmission and reception of images, and electronic mailing.

Teleprinter apparatuses of this general type are known in which peripheral units controlled by a central unit are used. The number of complexity of the peripheral units must however be limited in that their operation is a burden on the central unit. Moreover, this has the priority problem of controlling the line conversations.

The object of the invention is to provide an apparatus which is effectively controlled both for performing the essential message transmission and reception functions, and for executing more sophisticated operations directed towards improving its operational facilities.

SUMMARY OF THE INVENTION

The apparatus according to the invention comprises a transmission line, a first central processing unit, a first set of peripheral units which can be connected to said transmission line under the control of said first central processing unit, a second set of peripheral units for processing messages, a second central processing unit for controlling the peripheral units of said second set and an interface unit controlled by said first processing units for conditioning said second central processing unit to control said peripheral units of the second set to operate simultaneously with those of the first set.

BRIEF DESCRIPTION OF THE DRAWINGS

The invention will be described in more detail by way of example and with reference to the accompanying drawings, in which:

FIG. 3 is a block diagram of another part of the apparatus;

FIG. 7 is a flow diagram of the general operation of the part of the apparatus shown diagrammatically in FIG. 2;

FIG. 9 is a flow diagram regarding the general operation of the part of the apparatus shown diagrammatically in FIG. 3;

FIG. 10 is a diagram of the successive commands for the apparatus;

FIG. 11 is a diagram of some parts of a memory shown in FIG. 3;

FIG. 12 is a diagram showing the arrangement of data on a magnetic disc of the apparatus; and FIGS. 13 and 14 are two flow diagrams of the operations controlled by a particular command.

DESCRIPTION OF THE PREFERRED EMBODIMENT

Figure 1:
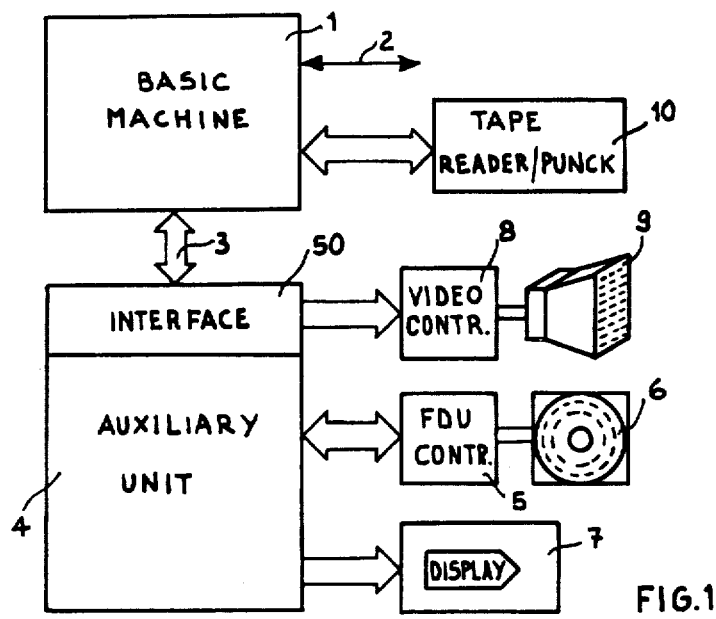
FIG. 1 is a general block diagram of a message transmission, reception and processing apparatus embodying the invention.

With reference to FIG. 1, the apparatus essentially comprises a teleprinter which performs the transmission-reception function for messages along the transmission-reception line, and also performs the print function, and will be known hereinafter as the basic machine.

The basic machine 1 can be connected to a reader-punch unit 10, which is arranged to punch a tape with messages arriving from the line 2 or composed by the operator. If necessary, the unit 10 reads the messages punched on the tape in order to transmit them and/or print them.

The basic machine 1 is connected by a bus 3 and an interface 50 to an auxiliary unit 4 which controls a set of additional devices. When connected to the basic machine 1, the auxiliary unit 4 extends its performance by controlling more sophisticated operations such as the composition and filing of messages and their display in the desired format.

The auxiliary unit 4 can be connected to a set of peripheral units comprising a magnetic recording unit 6 of the floppy disk type, hereinafter referred to as the FDU, a line display unit 7 and a page display unit (VDU) 9. The FDU 6 is used as an alternative to the read-punch unit. In this respect, the FDU 6, controlled by a controller 5, is used for filing messages to be transmitted or messages received.

The line display unit 7 is used for displaying messages to be transmitted. Alternatively, the VDU 9 can be connected to the unit 4 by means of a video controller 8, and displays complete messages with the addition of other information for the operator.

The basic machine 1 is constituted by a central unit (CPU) 20 (FIG. 2), which is connected to a first set of peripheral units. The CPU 20 is an 8-bit microprocessor for instance the well-known Z80 microprocessor manufactured by Zilog Inc. and is connected by way of the channel 3 directly to a ROM 21, a RAM 22, a EPROM reprogrammable memory 23, a printer 24, a programmable time signal generator 25, abbreviated to TSG, three programmable peripheral controllers 26, 27, 28, for example of model 8041 manufactured by Intel Corp., and a serial-parallel conversion device 29 known commercially by the name of SIO (serial input-output) of Zilog Inc.

The controller 26 functions as a keyboard encoder (KBE) for a desk keyboard (KBD) 30 while the controllers 27 and 28 respectively control a tape punch 31 and a reader 32 in the reader-punch unit 10. The SIO device 29 is connected to the line 2 by an interface 33. The ROM 21 contains the microprograms for the basic machine 1, which comprises an initializing microprogram T, a supervisor microprogram S and a set of programs A, B, C, D, E, known as handlers, and arranged to directly control the functions of the basic machine 1.

Each handler A, B, C, D, E is arranged to control one or more operations relating to a determined peripheral unit. The handlers are activated one at a time to control the operations of their respective responsibility, in the manner described hereinafter. In particular the handler A is arranged to control the interface 50 for transferring commands and characters to the CPU 52. The handler B controls the setting of the keyboard 30 and the tabulation and printing of the printer 23. The handler C controls the reception, the handler D controls all the functions of the printer 24, and the handler E controls transmission by way of the line interface 33. Each of the handlers A, D and E is arranged to address a corresponding register a, d and e of the RAM 22, to read commands or data relating to the operations controlled by it, the handler B is arranged to address an output register b of the keyboard controller 26, and the handler C is arranged to address a register c of the SIO 29.

The interface 33 is constituted by a logic control circuit 35 which controls two optical couplers 36 and 37, these being respectively at the output and input, which electrically isolate the circuit 35 from a matching circuit 38. In the case of full duplex transmission, this is connected at its output and input to two channels 39 and 40 respectively of the line 2. The signals from the channel 40 are thus fed through a conductor 42 to the SIO 29, and from here they are parallelized to the bus 3. The signals being transmitted along the conductor 41 are also fed to the conductor 42. The message characters which are supplied parallel by the SIO 29 are printed by the printer 24 in accordance with the printing mode contained in the handler D.

Alternatively, the message entered on the keyboard 30 can be stored on punched tape by the punch 31 controlled by the controller 27. By means of the controller 28, the tape reader 32 generates the punched messages in the channel 3, and these undergo processing analogous to that described for the messages fed directly by the keyboard.

The EPROM memory 23 contains all the data for defining the type of operation of the machine, i.e. data used by the microprogram I for initializing the various machine devices, data relative to the transmission modes which vary from country to country, data relative to the type of printing required, the automatic response etc.

The EPROM memory 23 is divided into seven separate zones E1-E7 according to the function of the data stored. The zone E1 contains the automatic response. The zones E2 and E3 essentially contain the respective commands for the reader-punch 10 for the printr 24. The zone E4 contains data to define the line and page format for the printer 24. The zone E5 contains all the data for defining the type of operation of the teleprinter, such as the method of selection of the remote station, optical and acoustic signals on the desk, the type of transmission, and the identification codes for the connected peripheral units, as described hereinafter. The zone E6 contains codes for defining all the line times. Finally the zone E7 is a protected zone which contains data relative to the form of the characters printed during transmission and reception, and other data which can in no case be modified.

The auxiliary unit 4 (FIG. 3) is connected to the interface 50 by a bus 51. The part 4 comprises a CPU central unit 52, for example of the above mentioned Z80 type, a ROM 50, and a RAM 54. A second set of peripheral units can also be connected to the bus 51 according to the required configuration, including the magnetic unit FUD 6 (as an alternative to the reader-punch unit 10), with its relative controller 5 provided with its own RAM and ROM memories 63, and the video controller 8 with its VUD 9, or the line display unit 7.

The ROM 53 contains the microprograms necessary for controlling the second set of peripherals, and comprises a zone F for the general control microprograms and a character generating program for the line display unit 7, a zone G for the control microprograms for the FDU 6, and a zone H reserved for the control and timing of the line display unit 7 and the control of the VDU 9.

The RAM 54, which constitutes the working memory of the unit 52, comprises a reserved zone L, the zone being reserved for the control logic, a zone M which stores a table of names and addresses of the addresses, and a zone N which contains an index of the messages contained in another zone P. Either messages to be transmitted or received messages can be recorded in the zone P. This is known as the editing memory, in that it enables the format and/or content of the messages recorded therein to be changed. The zones M and P are divided into predetermined blocks, each defined by a corresponding number X and addressable by means of this number.

The interface 50 (FIG. 4) comprises two latch registers 100 and 101 each having a capacity of one character, which connect together a data bus 120 and a data bus 121 forming part of the buses 3 and 51 respectively. The interface 50 also comprises three flip-flops 102, 103, 104, two logic gates 105 and 106, and two decoding devices 107 and 108 arranged to receive, over two address buses 109 and 111, (also part of the buses 3 and 51 respectively), the codes generated respectively by the CPU 20 and CPU 52 in order to decode them into corresponding commands for the interface 50.

There are also six connectors for six signals, namely INTERRUPT, RESET, WRITE, READ, FEINP and FEOUT, which are exchanged directly between the CPUs 20 and 52 and the interface 50.

When a command or character is ready in the basic machine 1 for transfer to the CPU 52, the CPU 20 sends on the bus 109 a command which, by means of the decoding device 108, activates a signal SELE which represents the selection of the interface 50 as addressee for the character. When the CPU 20 also activates the signal WRITE at the input to the AND gate 106, a strobe signal is produced over a line 110 for the latch 101, in which the CPU 20 can enter the character to be transferred, (input enable IE). The same signal over the line 110 sets the flip-flop 102, which in its turn makes activate the signal INTERRUPT directed to the CPU 52. This then interrupts any operation under way, and generates over the channel 111 a command which by way of the decoding device 107 sends on a line 112 a signal for strobing the output of the latch 101, (output enable OE). The character of the latch 101 is thus transmitted over the bus 121, where it can be read by the CPU 52. The same signals present on the lines 110 and 112 respectively set and reset the flip-flop 104 so that an output signal FEINP indicates, at all times, by means of a high logic level, that the latch 101 contains a stored character, and, by means of a low logic level, that this character has already been read by the CPU 52. The signal FEINP is examined by the CPU 20 before transferred each successive character, in order to ensure correct reception by the CPU 52 of all characters transmitted by the CPU 20. For each character taken by the CPU 52, the flip-flop 102 is reset, and consequently the INTERRUPT condition ceases, so that the control of its peripheral units can proceed.

When a character (or a command) is to be transferred to the basic machine 1 from a peripheral unit controlled by the central unit 52, the CPU 52 generates over the bus 111 a command which, by means of the decoder 107, produces a signal over a line 113 which strobes the latch 100 so that it memorizes the character to be transferred. The same signal over the line 113 sets the flip-flop 103, which makes activate at its output a signal FEOUT which indicates, by means of a high logic level, the presence of a character stored in the latch 100. The CPU 20 is never interrupted by the presence of a character to be read at the interface 50. It periodically examines the FEOUT signal and, if this is high, it reads the character or command stored in the latch 100.

For reading a character stored in the latch 100, the CPU 20 activates both the signal SELE in the manner described, and the signal READ at the output of the AND gate 105. A signal is then produced over an output line 114 from the gate 105 which strobes the latch 100 to send the character on the bus 120. The same signal over the line 114 resets the flip-flop 103, so that the signal FEOUT at the output goes to the low logic level, indicating that reading has taken place.

Figure 5:
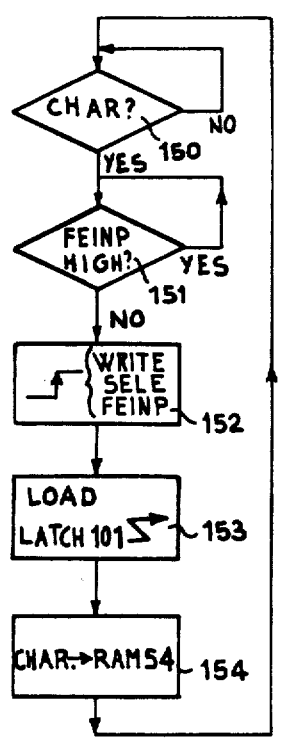
FIGS. 5 and 6 are flow diagrams of the interface operation.

With references to FIG. 5, the decision 150 indicates if a character is awaited for transfer from the basic machine 1 to the CPU 52. The decision 151 indicates if the latch 101 is free or not, indicated by FEINP. When these conditions are verified, the interface 50 is instructed to receive the character, so putting the signal FEINP high (block 152). The latch 101 is then loaded with the character to be transferred (block 153). The interrupted CPU 52 now executes a simple program (block 154) for storing into the RAM memory 54 the character to be transferred. The examination of the character stored in the memory 54 will be described with reference to FIG. 9. After these operations, the cycle is repeated until the characters to be transferred are exhausted. For transferring in the opposite direction, at the beginning the unit or units of the basic machine 1 (FIG. 1), to which the transfer is to be directed, are selected among those connected by the bus 3 (FIG. 2) to the CPU 20, including the line interface 33, for instance by generating the relevant commands on the keyboard 30. Then the signal FEOUT (FIG. 6) is examined periodically by the CPU 20 (decision 160). When this signal indicates that the CPU 52 has stored a character in the latch 100, the CPU 20 selects the interface 50 for reading and deactivates the signal FEOUT (block 161). The CPU 20 now reads the character from the latch 100 (block 162). The character thus read processed as to be is fed to the peripheral unit which has been selected from those connected to the CPU 20, or to be fed to the line (block 163).

With reference to FIG. 7, on starting the machine, indicated by the operation START 200, the initialization programs for the various peripheral units (operation 201) and the execution of the diagnostic programs (operation 202) are executed in known manner. The operation 203 which represents the activation of the supervisor program S is then carried out. The program S controls the handlers A, B, C, D, E in such a manner as to call them periodically and always in cyclic succession.

Figure 2:
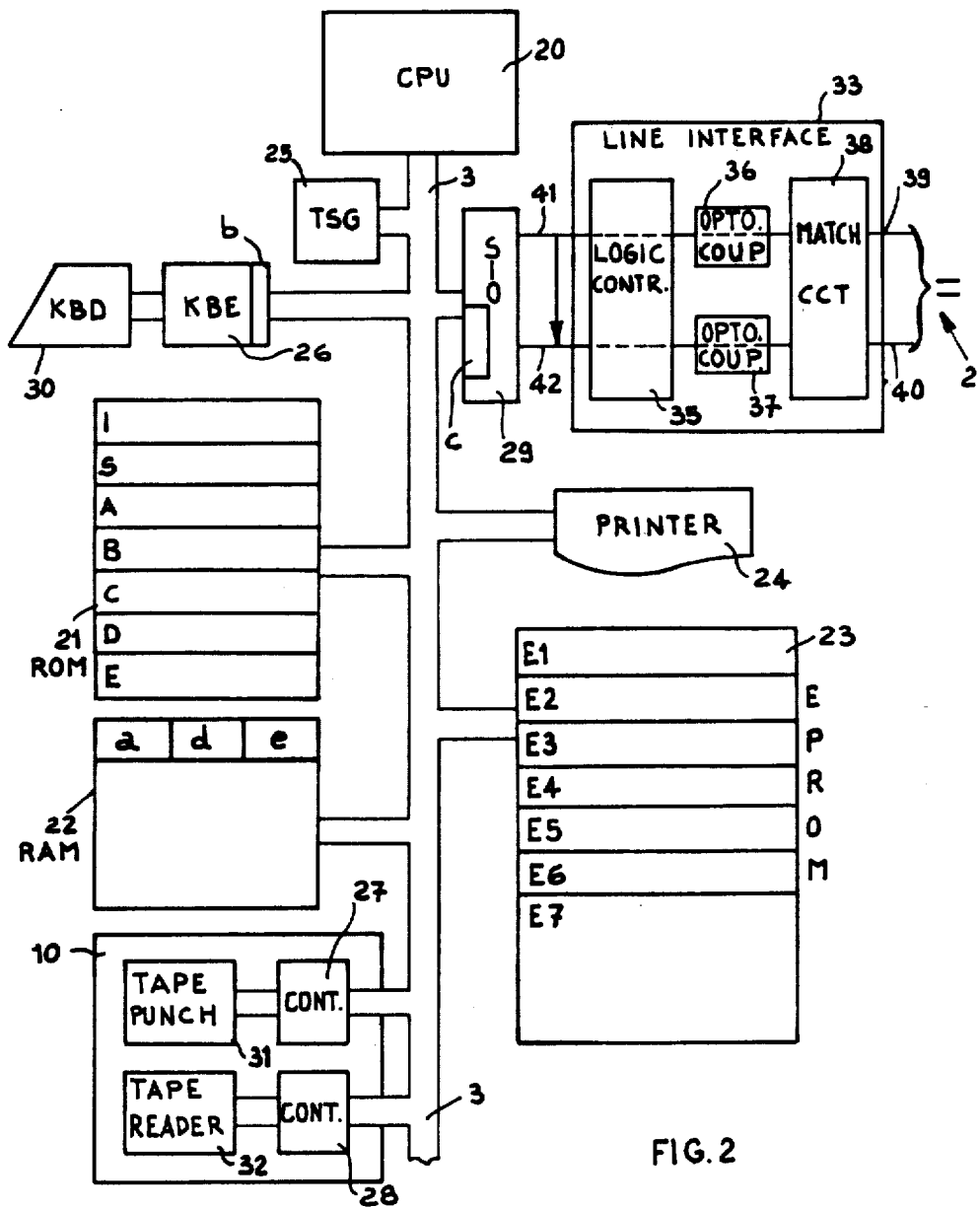
FIG. 2 is a block diagram of part of the apparatus of the apparatus.

The handler A is activated at the beginning of the operations. If a character is ready for transfer to the CPU 52 (FIG. 3) by way of the interface 50, it has been stored by the intervention, as will be seen hereinafter, of further handlers, B, C or E in the register a of the memory 22 (FIG. 2). A decision 205 (FIG. 7) is now made, indicating examination by the CPU 20, under the control of the handler A, of the register a of memory 22 in order to determine if there is a character destined for the CPU 52. If the decision examination gives positive results, the character is fed by the CPU 20 to the interface 50 (block 206) in the manner heretofore described. If the examination is negative, the handler A is interrupted (block 207) and control of the CPU 20 is given over to the supervisor program S, which calls the handler B for controlling the CPU 20. The handler B causes the CPU 20 to examine if in the output register b of the KBE controller 26 there are characters which have been typed on the keyboard 30 (decision 208). If there are, then an operation is carried out involving transfer of these characters, one at a time, into the memory 22 (block 209). These characters are fed selectively, as a function of setting controls, into the registers a, d, e for feeding the typed character to the CPU 52, printer 24 and line 2 respectively. If no typed character is present in the register b of the controller 26, the handler B is interrupted (block 210) and control is given over to the supervisor S, which now calls the handler C, and so on. The operation of the handlers C, D and E is entirely similar to that of the handlers A and B. In particular, the decision 211 checks the presence of a character originating from the line 2 and present in the register c of the SIO 29 (FIG. 2). The decision 214 checks the presence of a character ready for printing, which will be found in the register d of memory 22, and the selection 217 checks the presence, in the register e, of a character ready for feeding to line 2. Correspondingly, the operations 212, 215 and 218 represent respectively the feeding of the character received over the line 2 to one or more of the registers a, d and e, these being selected in accordance with commands set for the destination of the received character, the feeding of the character to be printed to the printer 24, and the feeding of the character to be transmitted over the line 2 by way of the interface 33. If the handlers C, D and E remain inactive, they pass control back to the supervisor S (blocks 213, 216 and 219 respectively).

It is also apparent that the operator has available appropriate keys on the keyboard 30 for selecting the various transfers controlled by the handlers A, B . . . E between the conventional peripheral units of the basic machine 1. These keys generate, by way of the keyboard encoder 26, codes which are interpreted by the CPU 20 according to known methods of the art.

The keyboard 30 (FIG. 8) comprises a group of keys and signal lamps contained in a module 250, these serving for controlling the printing, for controlling certain transmission functions, and for indicating certain machine states. The keyboard 30 also comprises a further group of keys contained in a module 251, which control the reader-punch unit 10. The keys contains in a module 252 represent the normal alphanumerical keyboard. The keys contained in a module 253 are used by the operator for controlling the line display unit 7 (FIG. 3) and the memory 54, which is used for storing messages and other data available to the operator.

In the module 253, keys 261-264 serve for positioning a message of the memory 54 on the display unit 7. This is divided into a zone for displaying messages and a zone for displaying service data, for example the number of characters introduced from the beginning of each line and each message.

The key 261 causes the displayed characters to scroll towards the left, the key 262 produces scrolling towards the right, and the key 263 causes display of the last part of a selected message in such a manner that the last character of this latter is displayed in the extreme right hand position of the display unit 7. The key 264 likewise causes display of the first part of the message. Finally, the key 265 cancels the last character on the right hand side of the display unit.

Figure 8:
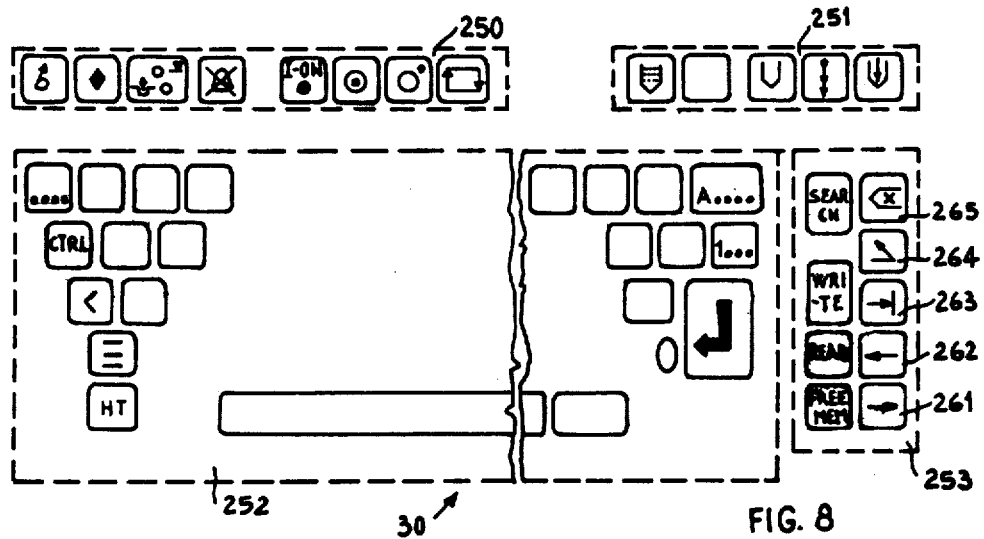
FIG. 8 is a diagram of the keyboard of the apparatus.

The module 253 of FIG. 8 also comprises a further four keys, namely SEARCH, WRITE, READ and FREE MEMORY.

When a command is typed by the operator on the keyboard 30 or arrives from the line 2 by way of the inerface 33, it is taken under the control of the handler B or handler C respectively (operation 300 in FIG. 9). It is then examined (block 201) to check (decision 302) whether it is a command for the basic machine 1 or for the CPU 52. If it is a command for the CPU 52, the block 303 follows to indicate its transfer and storage in the CPU 52, in the manner described with reference to FIGS. 4 and 5.

The diagram of FIG. 9 illustrates a series of operations (304–324) controlled by the CPU 52. During the execution of these operations 304–324, the CPU 20 in the basic unit controls the various other devices 22–27 of FIG. 2 and the line interface 33 as explained with reference to FIGS. 2 and 7. The result is true simultaneity between operations, such as the storing of the messages or their display (described hereinafter), and controlled by the CPU 52, and the basic operations of printing, transmission and reception, controlled by the CPU 20 of the basic machine 1. The result is to preserve full efficiency of the CPU 20 in controlling the basic operations, and to control the messages and their display rapidly.

In particular, the block 304 represents the operation of the CPU 52 in examining the command to be effected. Besides the commands which have been typed in locally on the keyboard 30 (FIG. 8), two commands are provided originating from the line 2, known as the CCCC and KLKL. The command CCCC conditions the processor 52 to automatically store the characters of the message reaching the memory 54. The command KLKL conditions the processor 52 to read the selected message, which is then automatically fed over the line 2. The commands are effected in the order indicated by the diagram of FIG. 10. If the command CCCC is not available, the operations of the CPU 52 always commence with a SEARCH command, typed by the operator in the manner described and followed by a number X indicating a certain block of the zone M or P of the memory 54, so that the command SEARCH X serves to select a predetermined message or file name stored in the memory 54. At this point, the CPU 52 can be controlled locally by the operator by means of the commands WRITE or READ. The commands WRITE and READ respectively determine the reading or writing in the locations of the memory block 54 selected by the command SEARCH X. Alternatively, the teleprinter can be left in the waiting state for the command KLKL originating from the line 2.

The command WRITE is followed by further commands which define the subsequent operations. The commands can either be those introduced by means of the keys 261–265 of the keyboard 30, or the command introduced by the FREE MEMORY key, or the codes of the characters of the message to be memorized.

If a command SEARCH X has been recognized by the operation 304 (FIG. 9), it can be of two types according to whether it is followed by a letter A (address) or M (message) typed on the keyboard 30. The letters A and M respectively identify the zone M of the memory 22, containing the names and addresses (FIG. 3), and the zone P containing the messages. In both cases, the command SEARCH X is followed by the operation indicated by the block 306, to record on an appropriate register of the memory 54, constituting the memory indicator, the initial address of the message (or file name) corresponding to the number X typed, thus updating the memory indicator.

On the basis of this message address, the appropriate control programs for the display unit 7, and contained in the zone F of the ROM memory 53, display the selected message, indicated by the block 207, in known manner.

If after the command SEARCH (FIG. 10) the next recognized command is WRITE, the CPU central unit 52 is activated to recognize the characters or commands subsequently typed on the keyboard 30, to execute a series of different operations. If a decision 310 (FIG. 9) has had a positive result, this signifies that one of the commands 261–264 has been recognized, and the corresponding positioning of the characters displayed on the display unit 7 will be carried out, indicated by the block 311. In contrast, a positive result of the decision 312 indicates that the cancellation command 265 has been recognized, this being followed (block 313) by the writing into the memory of the code IIIIIIII in place of the character to be cancelled. No corresponding character is displayed on the display unit, so indicating that the cancellation has taken place.

The decision 314 serves to establish whether the operator has typed the FREE MEMORY key. If he has, then this causes the display of a number indicating the memory space still free for messages, to enable the operator to know the memory situation.

Finally, block 316 indicates the recognition of an alphanumerical character typed on to the module 252 of the keyboard 30. In this case, the character is recorded in the memory (block 3117) and displayed on the display unit 7.

If however, after selecting a message by means of the key SEARCH X, the operator presses the key READ or if he adds the command KLKL for automatic reading of a message to be fed along the line 2, the selected message is directly read from that memory 54 and printed by means of the printer 24 (FIG. 2). Reading begins from the first character in the address I indicated by the number X (operation 318 in FIG. 9). The read character is then temporarily stored by operation 319 in the interface 5). From here, the CPU 20 reads the character in order to print it, and, if the reading operations have been determined by a command KLKL, the CPU 20 causes it to be fed to the line 2, indicated by the operation 321. It is therefore apparent that using the command SEARCH X, a message can be preselected from the memory 54, and then automatically transmitted at the request of a remote station when this feeds the command KLKL over the line 2.

Figure 4:
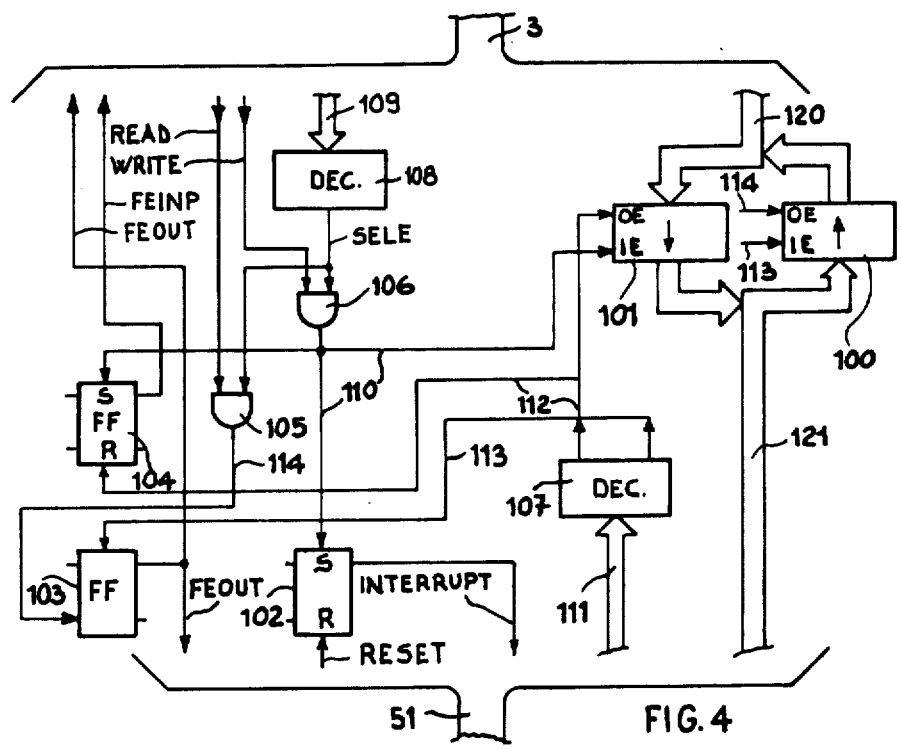
FIG. 4 is a logic diagram of the interface separating the two parts of the apparatus shown in FIG. 2 and FIG. 3.
Figure 6:
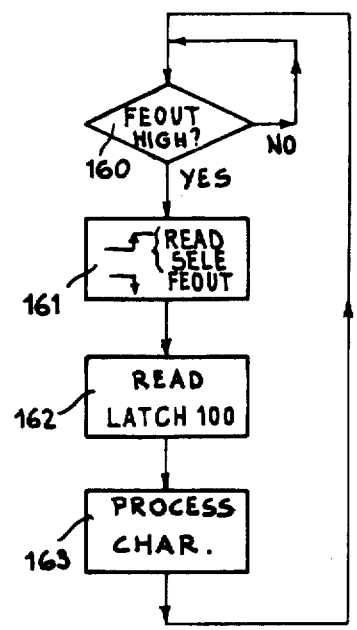

The method for transferring the characters of the selected message to the basic machine 1 has been described with reference to FIGS. 4 and 6, and the method in which the character to be printed and fed over the line 2 is handled in the basic machine 1 has been described with reference to FIG. 7.

The operation 322 (FIG. 9) identifies the character at the next address I+1, and the operations are repeated starting from the block 318. The routine 318-322 is repeated until the decision 323 indicates that all the characters of the selected message have been read.

The command CCCC causes the execution of a routine 324 consisting of an automatic search for free spaces in the memory 54 (FIG. 3) in order to record the arriving characters.

The execution of the aforesaid operation is always followed by the selection 308 (FIG. 9) in order to establish whether the CPU 20 has fed to the interface 50 (FIG. 3) any other commands to be executed or characters to be recorded under the control of the CPU 52. If further commands or characters (not shown in FIG. 9) reach the interface 50, they are examined by the CPU 52 on a priority basis, and the cycle resumes from block 304 (FIG. 9), whereas if they do not, then the CPU 52 is logically free to control its peripheral units.

The zone P of the memory 54 (FIG. 3) is divided into sixteen MSG (message) zones 1-16 (FIG. 11), each arranged to contain a message composed of a maximum of 256 characters. An index I1-16 of the part P. Each index Ix now stores an item of information known as BUSY, which indicates whether a message has been effectively stored in the corresponding MSG zones X. If it has, then the commencing address known as ADI and finishing address known as ADII of the message and items of information known as TYPE regarding the type of message stored are also stored, for example if relating to a message created locally or received from the line 2.

Figure 13:
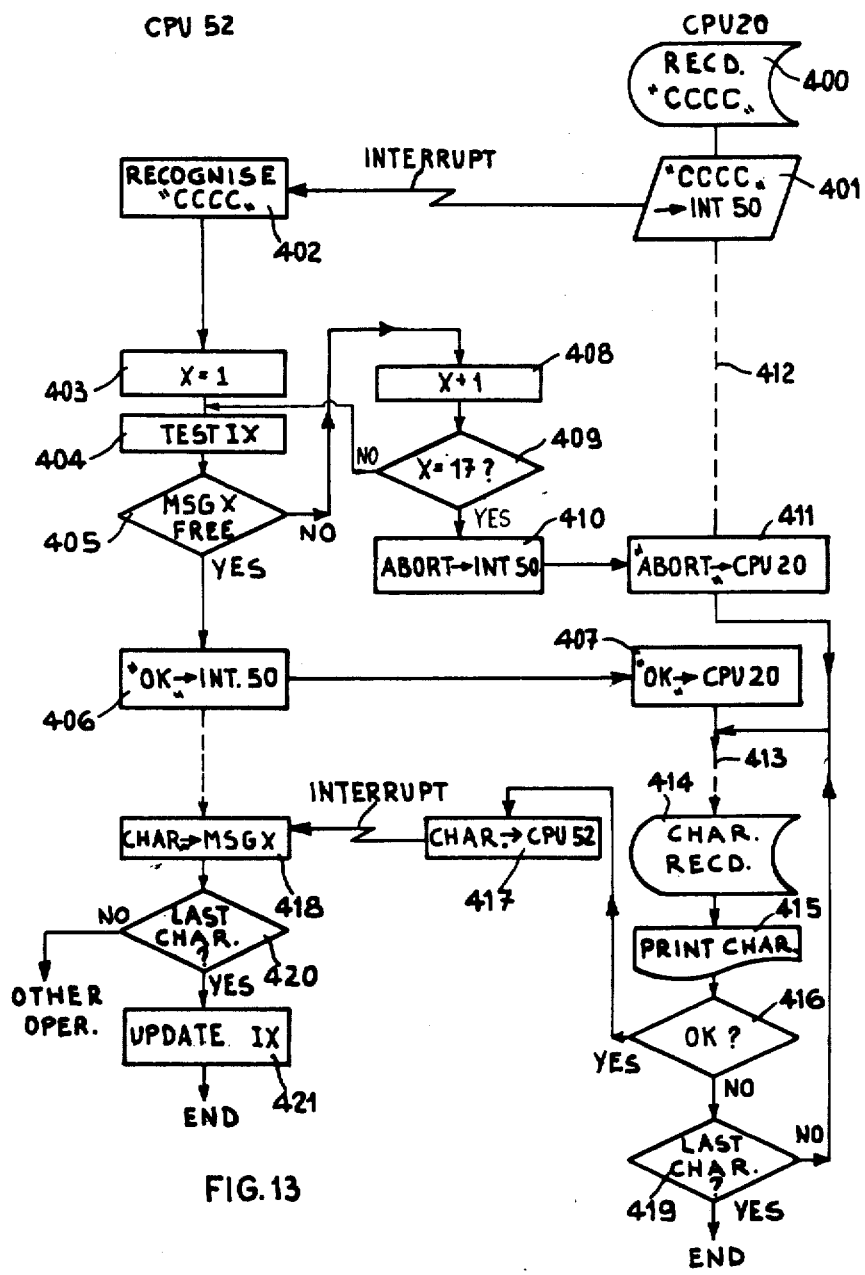

The various operations of the routine 324 of FIG. 9 are shown in FIG. 13, the operations controlled on the basic machine 1 by the CPU 20 being shown on the right, whereas the operations controlled by the CPU 52 are shown on the left. A dashed line between two operations indicates that the CPU 20 or 52 is at that time disengaged from handling the command CCCC, and is dedicated to controlling the peripheral units connected to it.

The operation 400 indicates that a command CCCC has reached the basic machine 1 through the line 2. It is immediately recognized and fed to the CPU 52 (operation 401) by way of the interface 50. The method for buffering the command in the interface 50 and for the interruption INTERRUPT of the CPU 52 are as already described with reference to FIGS. 4, 5 and 6. Once the command CCCC (operation 402 of FIG. 13) has been recognized, the CPU 52 examines the index zone N of the memory 54 by means of a routine 403-410. The routine 403-410 begins with an examination of the first index Ix, where at the beginning x=I (operation 403 and 404). The decision 405 indicates an examination of the information BUSY in the index Ix to establish whether the MSG zones X corresponding to the index Ix examined is free. In such a case a code OK is buffered in the interface 50 (operation 406), and from here is read by the CPU 20 (operation 407). If however the MSG zone X is occupied, the examination is repeated for the next index I(x+I) (operation 408). If the examination is repeated 16 times (decision 409) with negative result, then X=17, which means that all the MSG zones 1-16 of the memory 54 are already occupied by messages, and the CPU 52 causes a code known as ABORT to be buffered in the interface 50 (operation 410), which form here is read by the CPU 2) (operation 411). It must be emphasised that the search for a free MSG zone X carried out under the control of the routine 403-410 for storing the arriving message is handled entirely by the CPU 52, which is then isolated from the CPU 20, since no command is then present over channels 109 and 111 (FIG. 4). By virtue of this isolation, the CPU 20 can proceed during the search by the CPU 52 to control the devices of the basic machine 1. This condition is indicated by the dashed line 412 of FIG. 13. A dashed line 413 on the other hand indicates that the basic machine 1 is awaiting the reception 414 of a character from the line 2. In all cases, the character is printed by the printer 24 (operation 415) after the operations are distinguished by the decision 416, and according to whether the basic machine 1 has received the code OK or the code ABORT.

In the first case, a free MSG zone X has been identified in the memory 54, and the character is transferred to the CPU 52 in the normal manner (operation 417) and stored in the free MSG zone X by the operation 418. In the second case, the character is not fed to the CPU 52, and returns simply to the waiting state 413. If however the printed character represents the last character of the received message, the printing operations (decision 419 and 420 positive) terminate on the basic machine 1, and the zone N of the memory 54 is subjected to updating 421 with the information Ix corresponding to the MSG zone X occupied by the new message. This can be subsequently reutilized, for example displayed or reprinted or retransmitted.

If the magnetic recording unit FDU 6 is present (FIG. 3), the magnetic disc is divided into MSG blocks, each able to record a message. The MSG blocks reserved for the messages are 30 in number, namely MSG 1-30, and are represented by 30 sectors of 256 bytes of the magnetic disc 430 (FIG. 12). The corresponding indexes I1-I30 are all allocated to a predetermined sector 431 of the disc 430.

The zone N of the memory 54 (FIG. 3) is free, and is arranged to memorize temporarily the indexes I1-I30 contained in the sector 431, whereas zone M acts simply as a buffer for the messages read from the disc 430.

When the interface 50 receives a character to be filed, it is firstly stored (operation 452) in zone M which acts as a buffer. If the decision 453 indicates that this is the last character of the arriving message, the contents of the buffer are completely transferred to the FDU 6 (operation 454), after which the corresponding index Ix is updated in zone N of the memory 54 (operation 455). The contents of the index zone N are then again transferred to the sector 431 of the disc 430 (operation 456). If this is not the last character of the message, it is necessary to check whether it is the 256th character arriving from line 2, selection 457. In this case, the characters memorize in the buffer of zone M are of a number such as to fill an entire MSG sector of the FDU 6. An operation 458 follows in which all the characters stored in zone M are transferred to the MSGX sector of the FDU 6 previously selected.

The index Ix is then updated, 459, and is transferred to the sector 431 of the disc 430. Because of the fact that in this case it is assumed that other characters arrive from line 2, the number X is incremented by the operation 461 in order to proceed to a search (routine 404-410) for a further MSGX sector on the disc 430, able to receive the next arriving characters. Obviously according to the outcome of the search, the next part of the message can either be printed and stored as in the case of the preceding part, or if there are no free MSGX sectors, only printed.

It is consequently clear that the functions of the FDU 6 are controlled by the CPU 52 independently of the basic machine 1, while the commitment of the CPU 20 does not change with respect to the preceding cases, so always ensuring, for equal processing capacities, the effective control of the basic machine 1.

From the aforegoing, it is clear that on pressing suitable keys of the keyboard 30 (FIG. 8) and inserting a certain order number corresponding to the required name or address, the CPU 52, controlled by the basic machine 1 in the manner explained, gains access to the required file name contained in the zone M, and displays it on the display unit 7. During the selection of the remote station, this name is fed over the line 2. If however it is required to cancel or change the displayed name or address, it is only necessary to press the cancellation key 265 on the keyboard 30 and type the required changes. Finally, by a suitable known procedure, it is possible to address consecutively all the contents of the zone M with relative printing by the printer 24. With the aid of the index zone N, the control system for the editing zone P also provides for display, modification or recording of the messages contained in the memory, by means of suitable commands on the keyboard 30 in a manner similar to those previously described. In addition, if the machine is suitably set, arriving messages can be automatically recorded on to zone P of the editing memory (and, if required, on to the magnetic unit FDU 6) on command by appropriate codes sent over the line 2. In this case, the processor 52 consults the index N of the contents of zone P in order to position the arriving messages in suitable free zones, and provides for the necessary updating of the index.

It is apparent that various modifications can be made to the described apparatus within the scope of the claims. For example, any of the handlers A-E can control further functions besides those heretofore described with reference to FIG. 7. In this case, if after executing a function there occurs the interruption 207, 210, 213, 216 or 219 which hands over control of the CPU 20 to the supervisor program S, this controls the recording, into an appropriate register of the RAM 22, of the interruption address of the handler which during the next cycle resumes its operation from this address. In addition, the printer 24 can be replaced or supplemented by a facsimile printer so as to be able to transmit or receive images or drawings by means of the apparatus. The apparatus can thus be used for such modern telecommunications systems as those known by the names of telex, teletex, teletext and videotext. The apparatus can also be adapted to correct and expand received texts or texts to be transmitted, and for remote text processing, (word processing), and for so-called electronic mailing.

We claim:

1. A message transmission, reception and processing apparatus, said apparatus comprising:
   a first parallel bus;
   a keyboard connected to said first parallel bus for generating message characters and commands for commanding said apparatus;
   a printer connected to said first parallel bus for printing messages received from a telegraphic line and messages transmitted on said line;
   a line interfacing unit connected to said first parallel bus and to said telegraphic line for coupling message characters and commands from said first parallel bus to said telegraphic line when said apparatus is in a message transmitting mode and for coupling message characters and commands from said telegraphic line to said first parallel bus when said apparatus is in a message receiving mode;
   a first central processing unit connected to said first parallel bus for controlling the operation of said keyboard, said printer and said line interfacing unit;
   a second parallel bus operatively isolated from said first parallel bus;
   a memory unit connected to said second parallel bus for storing messages in a plurality of selectable zones;
   display means connected to said second parallel bus for displaying at least part of a message stored in a selected one of said plurality of zones in said memory means;
   a second central processing unit operating independently of said first central processing unit and connected to said second parallel bus for controlling the operation of said memory means and said display means;
   a bus interfacing unit connected to said first parallel bus and to said second parallel bus, said bus interfacing unit including memory means for storing message characters and commands received from one of said buses for transmission to the other of said buses;
   logic means connected to said first parallel bus and to said second parallel bus for controlling the operation of said bus interfacing unit, said logic means being controlled by said first central processing unit to cause said memory means of said bus interfacing unit to store message characters and commands received from said first parallel bus and to interrupt the operation of said second central processing unit, wherein said second central processing unit is caused to immediately receive the message characters and commands stored in said memory means of said bus interfacing unit;
   said logic means being further controlled by said second central processing unit to cause said memory means of said bus interfacing unit to store message characters and commands received from said second parallel bus and to provide a signal to said first central processing unit that message characters and commands are stored in said memory means of said bus interface unit, wherein said first central processing unit subsequently receives the message characters and commands stored in said memory means of said bus interface unit, and
   wherein said memory means of said bus interfacing unit comprises first and second registers, said first register being controlled by said logic means to temporarily store in sequence commands to be executed by said second central processing unit and message characters to be processed by said second central processing unit according to said commands, said second register being controlled by said logic means to temporarily store in sequence a series of message characters fetched from said memory unit, said first central processing unit periodically reading the contents of said second register.

2. An apparatus as claimed in claim 1 wherein each time said first central processing unit controls said logic means to cause said first register to store commands and message characters, said logic means generates an interrupt signal for said second central processing unit in order to force said second central processing unit to immediately read the commands and message characters stored in said first register so that said second central processing unit accepts the commands and message characters originating from said first central processing unit as a priority operation over any other operation of said second central processing unit.

3. An apparatus as claimed in claim 2 wherein said keyboard comprises manual control means operable for generating command codes for said second central processing unit, and wherein said line interfacing unit is adapted to receive from said telegraphic line command codes for said central processing unit, said first central processing unit including means for recognizing said command codes and for storing said command codes in said first register.

4. An apparatus as claimed in claim 3 further comprising a read-only memory connected by said first bus to said first central processing unit and recorded with a supervisor program and a set of microprogram handlers individually associated with said keyboard, said printer, said line interface and said bus interface unit, said first central processing unit being controlled by said supervisor program in order to activate said microprogram handlers in a predetermined sequence, said apparatus further including a random access memory comprising a set of zones associated with a particular one of said handlers and arranged for storing commands or characters, each of said handlers when activated causes said first central processing unit to examine its associated zone of said random access memory in order to read and execute the commands and to process the characters stored therein.

5. An apparatus as claimed in claim 3 wherein said manual control means comprises at least a first key arranged to generate a command for selecting a predetermined zone of said memory unit, and a second key arranged to generate a writing command in order to control the second central processing unit to store in the predetermined zone a message composed of the characters stored subsequently in the first register of said bus interface unit.

6. An apparatus as claimed in claim 3 wherein a writing command is received from said telegraphic line, said second central processing unit including searching means controlled by said first central processing unit for searching said memory unit for a free zone for storing a message originating from said telegraphic line, said first central processing unit selectively controlling said telegraphic line and said printer while the searching means of the second central processing unit is searching said free zone, and including indicating means effective when said searching means finds a free zone in said memory for controlling said second central processing unit to store said message in the free zone of said memory unit.

7. An apparatus as claimed in claim 6 wherein said memory unit comprises a group of zones each arranged to store a message formed from a predetermined number of characters and an index zone containing information regarding each zone of the group, said searching means searching said free zone by examining said index zone.

8. An apparatus as claimed in claim 7 wherein said memory unit comprises a second group of zones arranged to store addresses, said keyboard comprising keys arranged to select one zone of said first group and one zone of said second group so that a message read out from a selected zone of said first group is transmitted automatically to an address read out from a selected zone of said second group.

9. An apparatus as claimed in claim 8 further comprising a recording unit for recording messages on a magnetic medium including a plurality of zones, each zone of said plurality being adapted to store a message formed of a predetermined number of characters, said magnetic medium also including an index zone containing information regarding each zone of said plurality, said recording unit being controlled by said second central processing unit, said writing command controlling said second central processing unit to cause the information contained in the index zone of said medium to be initially stored in the index zone of said memory unit in order to enable said searching means to search for a free zone among said plurality of zones, said indicating means being responsive to said searching means when finding a free zone on said medium to control said second central processing unit to cause the message to be recorded in the free zone of said medium.

10. An apparatus as claimed in claim 9 comprising a display unit connected to said second parallel bus and arranged to be controlled by said second central processing unit in order to display at least part of a line of the message recorded in a selected zone of the groups of zones of said memory unit or in said predetermined zone of said memory unit, said keyboard comprises a plurality of keys arranged to cause the characters displayed on the display unit to scroll in order to select the displayed part of the memory zone.

11. An apparatus as claimed in claim 9 wherein said second central processing unit temporarily stores the characters originating from said telegraphic line in a predetermined zone of said memory unit, said second central processing unit transferring the characters from that zone of said memory unit to the free zone of said magnetic medium when the characters stored in said memory unit are of a predetermined number so that the free zone of said magnetic medium becomes completely filled.

12. An apparatus as claimed in claim 11 wherein, while the data characters are being received from said telegraphic line, the search for a free zone of said medium is repeated automatically after each transfer so that while the first central processing unit controls the characters received, the second central processing unit controls the characters received, the second central processing unit stores the characters in the predetermined zone of said memory and repeatedly searches for the free zone of said medium and transfers the message to the found free zone of said medium.

* * * * *